US009389083B1

(12) United States Patent
Agulnik et al.

(10) Patent No.: US 9,389,083 B1
(45) Date of Patent: Jul. 12, 2016

(54) METHOD AND APPARATUS FOR PREDICTION OF A DESTINATION AND MOVEMENT OF A PERSON OF INTEREST

(71) Applicant: MOTOROLA SOLUTIONS, INC, Schaumburg, IL (US)

(72) Inventors: Anatoly Agulnik, Deerfield, IL (US); Fabio M. Costa, Weston, FL (US); Kenneth W. Douros, South Barrington, IL (US); Melanie A. King, Hollywood, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 31 days.

(21) Appl. No.: 14/587,020

(22) Filed: Dec. 31, 2014

(51) Int. Cl.
*G01C 21/00* (2006.01)
*G06Q 50/00* (2012.01)
*G06Q 50/26* (2012.01)
*H04L 1/00* (2006.01)

(52) U.S. Cl.
CPC .............. *G01C 21/00* (2013.01); *G06Q 50/01* (2013.01); *G06Q 50/265* (2013.01); *H04L 1/00* (2013.01)

(58) Field of Classification Search
CPC .......... H04L 1/00; G06Q 30/00; G06Q 50/01; G06Q 50/265; G01D 21/00
USPC .......................... 701/409, 410, 425, 439, 440
See application file for complete search history.

(56) References Cited

U.S. PATENT DOCUMENTS

| | | | |
|---|---|---|---|
| 6,975,346 B2 | 12/2005 | Kumhyr | |
| 7,944,468 B2 | 5/2011 | Hoffman et al. | |
| 8,326,315 B2 * | 12/2012 | Phillips | G08B 21/0236 |
| | | | 348/552 |
| 2009/0074258 A1 | 3/2009 | Cotgreave | |
| 2012/0120241 A1 | 5/2012 | Lewis et al. | |
| 2012/0174037 A1 * | 7/2012 | Relyea | G06F 3/0481 |
| | | | 715/848 |
| 2014/0016836 A1 | 1/2014 | Gamliel | |
| 2014/0022392 A1 | 1/2014 | Pederson | |
| 2014/0038544 A1 | 2/2014 | Jones et al. | |
| 2014/0088856 A1 * | 3/2014 | Wouhaybi | G06F 17/3087 |
| | | | 701/118 |
| 2014/0188993 A1 | 7/2014 | Klein et al. | |
| 2014/0279785 A1 | 9/2014 | Prieditis et al. | |

OTHER PUBLICATIONS

The International Search Report and the Written Opinion, PCT/US2015/065292, filed: Dec. 11, 2015, mailed: Mar. 4, 2016, all pages.

* cited by examiner

*Primary Examiner* — Gertrude Arthur Jeanglaud

(57) ABSTRACT

A method and apparatus are provided that aid law enforcement agencies in intercepting a suspect before he or she can go into hiding. The method and apparatus provide for law enforcement agencies to track a person of interest (POI) and to predict an intercept point and/or a destination where the POI may be found, based on situational data and social media content. Further, the method and apparatus provide for determining and adjusting a geofence based on a predicted route and/or destination of a POI and for dispatching public safety officers to the geofence, predicted intercept point, and/or predicted destination to aid in the apprehension of the POI.

9 Claims, 3 Drawing Sheets

METHOD AND APPARATUS FOR PREDICTION OF A DESTINATION AND MOVEMENT OF A PERSON OF INTEREST

FIELD OF THE INVENTION

The present invention relates generally to social media aggregation systems and, in particular, to a method and apparatus for analyzing social media content to predict a destination and movement of a person of interest.

BACKGROUND OF THE INVENTION

Video surveillance equipment is becoming more commonplace and ubiquitous. For example, public safety agencies are installing ever increasing quantities of video surveillance equipment in public places, and surveillance devices, such as wearable cameras and camera phones, are in increasing use, both among public safety officers and the general public. Further, video analytics, such as facial recognition technology, is becoming more refined.

When a person of interest enters a private facility, such as a private residence or place of business, a search warrant typically is required in order to access the private facility, creating a delay in searching the facility and possibly allowing the person of interest to escape capture. Therefore, it would be advantageous to intercept a person of interest before he or she can enter a private facility or otherwise go into hiding.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
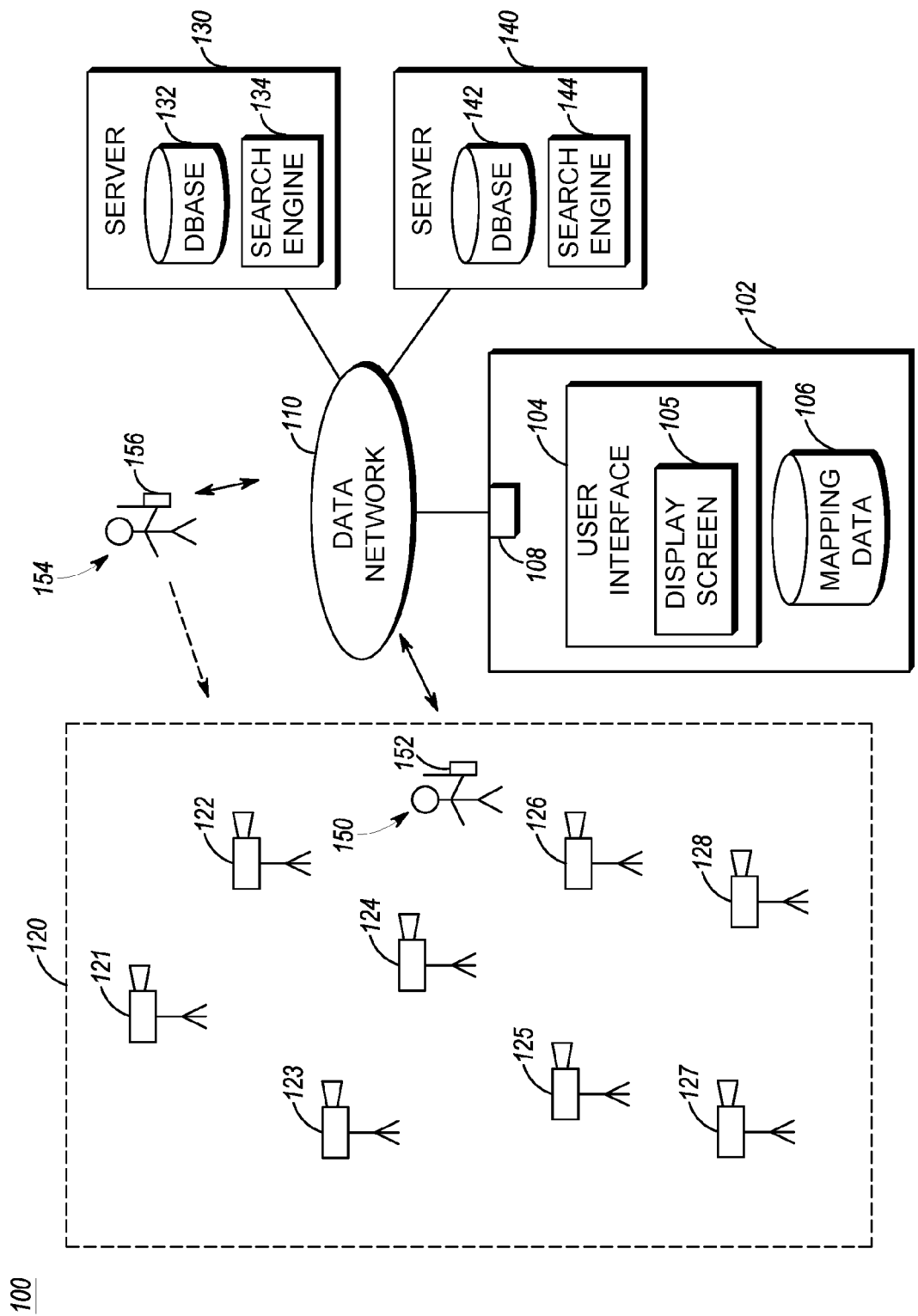
FIG. 1 is a block diagram of an exemplary communication system in accordance with an embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

To address the need for an effective informational tool for law enforcement agencies to aid in intercepting a suspect before he or she can go into hiding, a method and apparatus are provided that provide an informational tool for law enforcement agencies to track a person of interest (POI) and to predict an intercept point and/or a destination where the POI may be found, based on situational data and social media content. Further, the method and apparatus provide for determining and adjusting a geofence based on a predicted route and/or destination of a POI and for dispatching public safety officers to the geofence, predicted intercept point, and/or predicted destination to aid in the apprehension of the POI.

Generally, an embodiment of the present invention encompasses a method for analyzing social media. The method includes identifying a person of interest (POI), assembling a collection of personal information and social media content associated with the POI, predicting one or more of a destination of the POI and a movement of the POI based on the collection of personal information and social media content, and determining an intercept point for the POI based on the predicted one or more of a destination of the POI and a movement of the POI.

Another embodiment of the present invention encompasses a social media information processing system comprising a network interface, a processor, and an at least one memory device that is configured to store a set of instructions that, when executed by the processor, cause the processor to perform the following functions: identify the POI, assemble a collection of personal information and social media content associated with the POI, predict one or more of a destination of the POI and a movement of the POI based on the collection of personal information and social media content; and determine an intercept point for the POI based on the predicted one or more of a destination of the POI and a movement of the POI.

Turning now to the drawings, the present invention may be more fully described with reference to FIGS. 1-3. FIG. 1 is a block diagram of an exemplary communication system 100 in accordance with an embodiment of the present invention. Communication system 100 includes a data network 110, multiple public safety personnel 150, 154 (two shown), and multiple data capture devices 121-128. Data capture devices 121-128 are geographically dispersed throughout a geographical area 120.

Data network 110 can include one or more wireless access nodes, such as base stations, node B's, evolved node B's (eNB), access terminals, repeaters, and the like, which access nodes generally provide wireless connectivity for the data network 110. Data network 110 may comprise a wide area network (WAN), a local area network (LAN), a telephone network such as a Public Switched Telephone Network (PSTN), the Internet, a privately operated data network such as an enterprise network, a wireless network such as a cellular network or a Wireless LAN (WLAN), a Public Safety network, or a combination of networks. For example, data network 110 may include a public safety (PS) network that can utilize, for example, Long Term Evolution (LTE), Enhanced Voice-Data Optimized (EVDO), IEEE 802.11 and variants thereof ("Wi-Fi"), Project 25 (P25), Digital Mobile Radio (DMR), Land Mobile Radio (DMR), Terrestrial Trunked Radio (TETRA), etc. Data network 110 additionally, or instead, can include LTE, EVDO, Wi-Fi, etc. In an exemplary embodiment, data network 110 can include commercial wireless provider networks. Data network 110 is described herein for illustration purposes, and those of ordinary skill in the art will recognize the methods and systems contemplate operation with any wireless or mobile network configuration.

Communication system 100 further includes a social media information processing system 102 with a mapping data database 106 that can be communicatively coupled to data network 110 to provide a central or distributed controller for the methods and systems described herein. Note, while illustrated in FIG. 1 as a separate device, social media information processing system 102 can be distributed between various elements of an infrastructure of communication system 100. Social media information processing system 102 is connected to multiple servers 130, 140 (two shown) via data network 110. Each data capture device 121-128 is connected to social media information processing system 102 and to the multiple servers 130, 140 via data network 110. Additionally, each of the multiple public safety officers 150, 154 is wirelessly connected to data network 110 by a respective user mobile device 152, 156.

Data capture devices 121-128 may be fixed devices, such as cameras and Light Detection and Ranging (lidar) affixed to a suitable structure, such as a building or a post, in which event a location of the data capture device, such as an address of the device or of a structure to which the device is attached, may be pre-configured and maintained in social media information processing system 102. In other embodiments of the present invention, one or more of data capture devices 121-128 instead may be a mobile device, such as but not limited to a camera phone that may be used by a user to capture ambient audio and/or video, for example but not limited to a cellular telephone, a radio telephone, a smart phone, a vehicular mobile mounted device (VML) that includes camera functionality, or a camera mounted along a road or on some type of aircraft. In the event that a data capture device 121-128 is a mobile device, social media information processing system 102 may determine a location of the data capture device in accordance with well-known cellular mobile device location determination techniques.

The data capture devices 121-128 capture social media content, and in particular situational data such as video, video frames, and pictures of a field of view (FOV) of the data capture devices, across a geographical area or scene 120, and provide the captured social media content to one or more of servers 130 and 104 and social media information processing system 102. In one such embodiment, each data capture device 121-128 may embed in the data, or otherwise provide, a time stamp in association with such data, which time stamp corresponds to a time that the data is captured by the data capture device. In another such embodiment, a server 130, 140, or social media information processing system 102 may associate a time stamp with the data received from a data capture device upon receipt of the data, which time stamp corresponds to a time at which the data is received by the server or social media information processing system. Further, in some instances, such as when a data capture device 121-128 is a mobile device operated by a user of the device, the device may permit a user to enter, and convey to network 110, text or audio information, such as situational data such as locations, events, and persons observed by the user. Based on such situational data, a location of a person of interest (POI) in geographical area/scene 120 may be determined in association with a time at which the POI is detected at that location, and a movement of person of interest (POI) may be tracked across the geographical area/scene.

Social media information processing system 102 may be any kind of computer system into which a user may enter a data query and which includes a display for displaying results of that query. For example, social media information processing system 102 may be a personal computer, a laptop computer, a server, or a communication console such as used in a computer-assisted dispatch (CAD) system, for example, a Public Safety system. Social media information processing system 102 includes a user interface 104 via which a user may input a data query into the user terminal, and a display screen 105 for displaying the data query and results of a corresponding data search. Social media information processing system 102 further includes a network interface 108, for example, a wireless, wireline, or optical interface, for connecting to data network 110.

Servers 130 and 140 each includes a respective database 132 and 142 that may receive and store one or more of personal information and social media content captured by data capture devices 121-128 and mobile devices 152 and 156. Databases 132 and 142 each may be searched by social media information processing system 102. More particularly, servers 130 and 140 each includes a respective server entity that may collect, process, and maintain data in the corresponding database 132 and 142 and a respective search engine 134 and 144 that may search the database, or other databases that may be internal or external to the server, in response to receiving a query from social media information processing system 102. In other embodiments of the present invention, one or more of search engines 134 and 144 may be external to, and in communication with, a corresponding server 130 and 140. Databases 132 and 142 are repositories of personal information, for example, home addresses and personal physical traits, such as maintained by Department of Motor Vehicle (DMV) databases, and/or and social media content, such as video recordings, audio recordings, emails, tweets, Facebook entries, criminal records (such as a Records Management Service (RMS)), or any other social media content. Servers 130 and 140 each may be connected to data network 110 via any of a wireless, wireline, or optical connection, or any other connection known in the art.

Further, it is assumed herein that the personal information and social media content stored in databases 132 and 142 is stored in association with one or more attributes of the content. Such attributes may be any descriptor of the content that may be searched by a database search engine. For example, a searchable personal information attribute may be any kind of identifier of an individual, such as a name, personal traits such as height, weight, and eye, hair, and skin color, an address, a social security number, and financial information such as a bank account or a credit card. By way of further example, a searchable social media content attribute may be a 'source,' that is, an identifier of a source (for example, a person) of the content; a 'content location,' that is, a location associated with the occurrence of an event depicted in the content (for example, any one or combination of location parameters, such as a discrete location like a jewelry store and or a pub, a street intersection, a city, or Global Positioning Satellite (GPS) coordinates); a 'source location,' that is, a location associated with the source when posting the content; a 'content time,' that is, a time associated with the occurrence of an event depicted in the content; a 'posting time,' that is, a time that the content was posted; a 'victim,' that is, a victim of an event depicted in the content; a 'perpetrator,' that is, a 'perpetrator' of an event depicted in the content; an 'event,' that is, the event associated with the content (for example, a concert, an athletic event, a car theft, a robbery, or a shooting); and 'relatives/associates/group members,' that is, a listing of a person and his/her known relatives, associates, or groups, such as a gang, and other known members of the group (for example, which relationships may be maintained in records in an RMS database). This list of attributes is provided to illustrate the principles of the present invention and is not intended to be a comprehensive listing of all attributes that may be associated with social media content.

Figure 2:
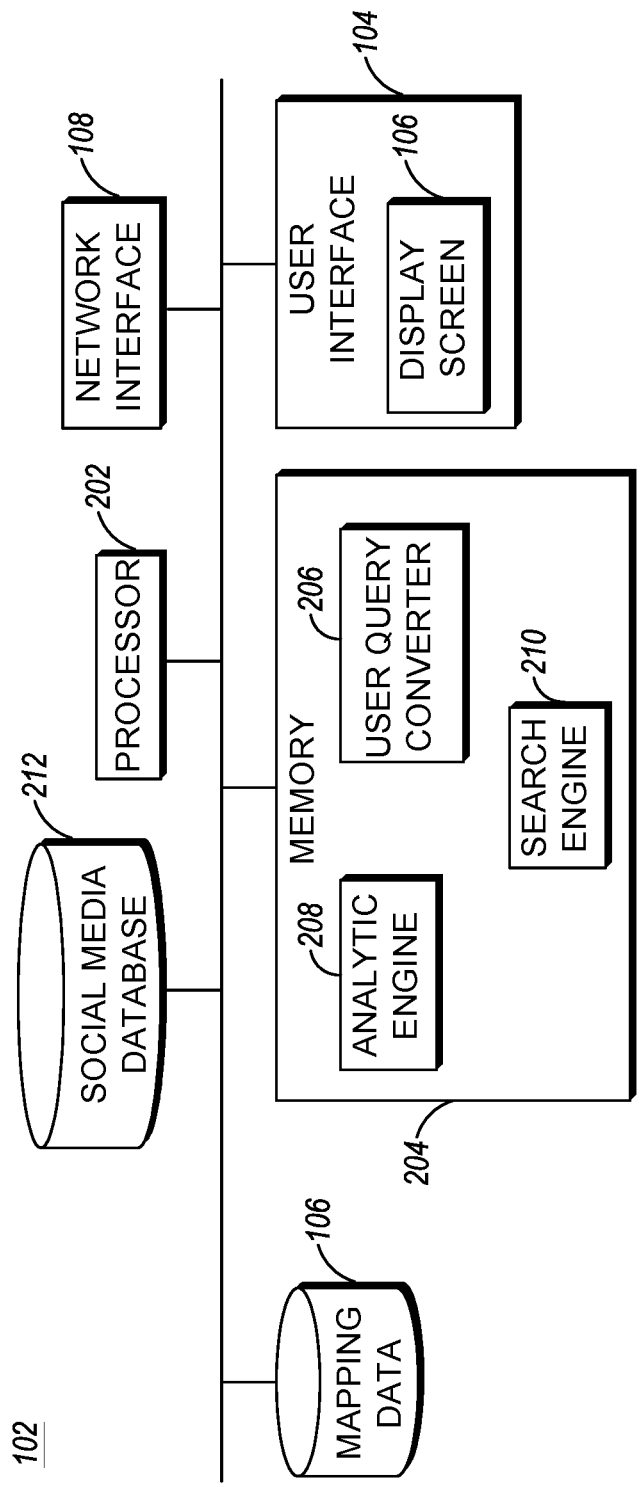
FIG. 2 is a block diagram of a social media information processing system of the communication system of FIG. 1 in accordance with an embodiment of the present invention.

Referring now to FIG. 2, a block diagram is depicted of social media information processing system 102 in accordance with various embodiments of the present invention. Social media information processing system 102 includes a processor 202, such as one or more microprocessors, microcontrollers, digital signal processors (DSPs), combinations thereof or such other devices known to those having ordinary skill in the art. The particular operations/functions of processor 202, and thus of social media information processing system 102, is determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor. However, one of ordinary skill in the art realizes that the operations/functions of processor 202 alternatively may be implemented in hardware, for example, integrated circuits (ICs), application specific integrated circuits (ASICs), a programmable logic device such as a PLD, PLA, FPGA or PAL, and the like, implemented in the user computer device. Based on the present disclosure, one skilled in the art will be readily capable of producing and implementing such software and/or hardware without undo experimentation.

Social media information processing system 102 further includes user interface 104 and network interface 108, which user interface and network interface each is coupled to processor 202. As described above, network interface 108 may be a wireless, wireline, or optical interface capable of conveying messaging, such as data packets, to, and receiving messaging from, data network 110. User interface 104 includes display screen 105, which display screen may or may not comprise a capacitive touchscreen, and further may include a keypad, buttons, a touch pad, a joystick, a mouse, an additional display, or any other device useful for providing an interface between a user and an electronic device such as social media information processing system 102. Display screen 105 may be a liquid crystal display (LCD), a light emitting diode (LED) display, a plasma display, or any other means for visually displaying information.

At least one memory device 204 may maintain facial recognition software that, when executed by processor 202, identifies individuals depicted in, for example, a picture, video, or video frame. Social media information processing system 102 then may display identifications of the individuals on display screen 105, and an operator of social media information processing system 102 then may search social media databases 132, 142 of servers 130, 140 or a social media database 212 of the social media information processing system by querying search engines 134, 144 of servers 130, 140, or by querying a search engine 210 of the social media information processing system. At least one memory device 204 further may include a user query converter module 206, an analytic engine 208, and search engine 210. User query converter module 206, when executed by processor 202, converts a user's query, received from a user via user interface 104, into a machine readable format, that is, searchable code that may be executed by a search engine, such as search engines 134 and 144 of servers 130 and 140. In response to social media information processing system 102 receiving content from servers 130 and 140 or social media database 212, analytic engine 208, when executed by processor 202, then analyzes the content to predict a route and a current location or (final) destination of a person of interest (POI). Social media information processing system 102 then may display the retrieved content and predicted route and/or destination on display screen 105, for example, by depicting the predicted route and/or destination on a map on the display screen.

Social media database 212 stores social media content retrieved, or downloaded, by the social media information processing system, for example, from databases 132, 142, data capture devices 121-128, and/or mobile devices 152, 156. However, in another embodiment of the present invention, social media database 212 may be maintained in an infrastructure device external to, and accessible, by the social media information processing system. Social media information processing system 102 further includes a mapping data database 106 in communication with processor 202. Mapping data database 106 maintains geographical information for a given geographical area, such as street maps, terrain maps, park and building locations, and public transit information, such as routes, stations, and schedules.

Variously, social media information processing system 102 is configured to define a dynamic geofence based on the mapping data 106 and information from data capture devices 121-128 and/or mobile devices 152, 156, predict a destination and movement of a person of interest (POI), make decisions relative to the geofence and predicted POI destination and movement, and dispatch public safety officers when appropriate. As described herein, the geofence is a geographical area of interest based on the POI route and destination. The geofence can move or change over time based on feedback from data capture devices 121-128 and/or mobile devices 152, 156 and further based on social media content stored in servers 130 and 140 and/or social media database 212.

Figure 3:
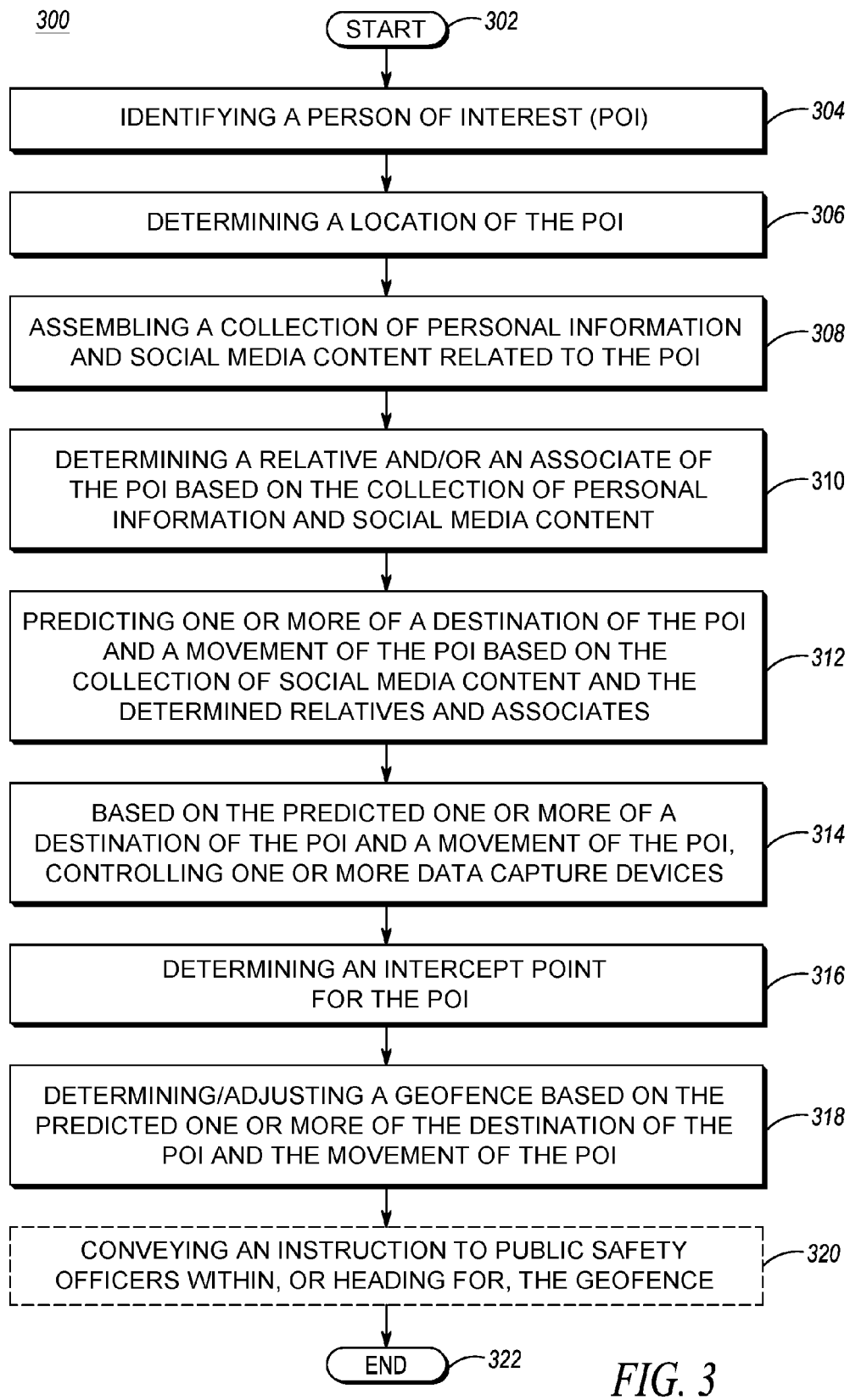
FIG. 3 is a logic flow diagram illustrating a method performed by the user terminal of the communication system of FIG. 1 in analyzing social media accordance with some embodiments of the present invention.

Referring now to FIG. 3, a logic flow diagram 300 is provided that illustrates a method performed by social media information processing system 102 in predicting person of interest (POI) destination and movement in accordance with some embodiments of the present invention. Logic flow diagram 300 begins (302) when social media information processing system 102 identifies (304) a person of interest (POI).

For example, an operator of social media information processing system 102 may enter into the social media information processing system, via user interface 104, an identifier of the POI, such as a person's name or a personal identifier, for example, a social security number or any other personal identifier known in the art. By way of another example, social media information processing system 102 may identify a POI based on social media content received by the social media information processing system from one or more of the data capture devices 121-128 and mobile devices 152 and 156. In one such example, social media information processing system 102 may receive pictures, video, or video frames from one or more of the data capture devices 121-128 and mobile devices 152 and 156 and, utilizing facial recognition software maintained in at least one memory device 204 and executed by processor 202 of the social media information processing system, identify the POI in pictures, video, or video frames. In another such example, social media information processing system 102 may receive a text message, instant message, or email from one or more of mobile devices 152 and 156 identifying the POI.

Further, social media information processing system 102 determines (306) a location of the POI. For example, based on situational data sourced by one or more of data capture devices 121-128 and by reference to mapping data database 106, social media information processing system 102 may determine a geographical location of the POI. For example, when the POI is depicted in media content provided by a data capture device 121-128 or mobile devices 152 or 156, social media information processing system 102 may, based on a location of the data capture device and/or by reference to mapping data database 106, determine a geographical location of the device and a corresponding geographical location of the POI. Further, in some instances, such as when a data capture device 121-128 is a mobile device operated by a user of the device or in the case of mobile devices 152 and 156, the device may permit a user to enter, and convey to social media information processing system 102 via network 110, text or audio information that includes situational data such as a location of the POI.

In response to identifying the POI, social media information processing system 102 assembles (308) a collection of related personal and social media content. In various embodiments, social media information processing system 102 may assemble the collection by retrieving the social media content from one or more of the multiple databases 132, 142, and 212 in accordance with known techniques and/or by receiving social media content from a source of the content, for example, from a police officer submitting a police report or from a surveillance camera disposed in a public or private location.

In assembling a collection of personal information and social media content, social media information processing system 102 searches for personal information and social media content having particular values for associated attributes. For example, a personal information value may be a person's name or address, a value associated with a personal trait such as a height, weight, hair/eye/skin color, a social security number, or a bank account or a credit card number. By way of further example, a value associated with a 'content location' or 'source location' attribute may be an intersection, a specific store, a store-type (e.g., a jewelry store), a neighborhood, a city, or GPS coordinates with respect to location. By way of another example, a value associated with a 'content time' or 'posting time' attribute may be, for example, a time of day, a date, a month, or a year. By way of yet another example, a value associated with a 'source,' victim,' or 'perpetrator' parameter may be a name, a face, or any other identifier that may uniquely identify a person.

Social media information processing system 102 may assemble a collection of personal information and social media content based on a determination that the personal information and social media content are related, for example, that the personal information and social media content include or reference a common personal information value. Further, various social media contents may be related with they have related values for the 'source' attribute, for example, when a source of social media content is a relative of, or a known associate of, a POI. Whether two sources are relatives of, or known associates of, a POI may be determined, for example, by reference to records downloaded by social media information processing system 102 from an RMS database. By way of another example, various social media contents may be related with they have related values for the 'content location' or 'source location' attribute, for example, when they are sufficiently close in location to an incident or to each other, or when the location attribute falls within geographical area 120, for example, addresses, street intersections, neighborhoods, or stores that are within the geographical area. By way of yet another example, various social media contents may be related with they have related values for the 'content time' or a 'posting time' attribute, for example, when they are sufficiently close in time to a given time being searched, such as a time of an occurrence of an incident, for example, when their difference in time is less than a difference threshold. A determination of what values are sufficiently close so as to considered to be 'related' is up to a designer of communication system 100 or a person assembling the collection of personal information and social media content.

Based on the assembled collection of personal information and social media content, social media information processing system 102, and in particular analytic engine 208, determines (310) one or more of a relative of the POI and an associate of the POI. Further, based on the assembled collection of personal information and social media content, the determined relative and/or associate of the POI, and by reference to mapping data database 106, social media information processing system 102, and in particular analytic engine 208, predicts (312) one or more of a destination of the POI and a movement of the POI.

That is, based on the social media content, such as Facebook entries identifying the POI or tweets of sightings of the POI, and/or situational data sourced by one or more of data capture devices 121-128 and by reference to mapping data database 106, social media information processing system 102 may determine a direction of movement of the POI. For example, based on such Facebook entries or tweets or a detecting of a presence of the POI in media content sourced by multiple data capture devices 121-128, a time stamp associated with such media, and the locations of each of the multiple data capture devices 121-128, social media information processing system 102 can determine a direction of movement of the POI. Further, based on the determined direction of movement of the POI and determined relatives and associates of the POI and their corresponding locations or addresses, and/or the geographical information maintained by mapping data database 106, such as public transit information such as public transit routes, station locations, and schedules, social media information processing system 102 may predict a destination of the POI and further may predict a time at which the POI will be located as the predicted destination. Based on the determined current geographical location and the predicted destination of the POI, social media information processing system 102 may predict a future movement, that is, a geographical route, expected to be taken by the POI. However, social media information processing system 102 may predict a geographical route of the POI even in the absence of a predicted destination, for example, based on an extension of a detected current route of the POI.

Further, based on the collected social media content, social media information processing system 102 may select a more likely geographical route of the POI, or a more likely destination, from among multiple possible routes and destinations. For example, a determining of a most likely geographical route of the POI may include consideration of factors such as events, for example, parades or concerts, occurring along possible routes and detected from the collection of social media content, and/or factors such as whether a given route is congested (for example, busy with traffic) or open or comprises an alley to cut through, a park, or a public transit station. A weight may be assigned to each such factor in determining a most likely geographical route, which weight is associated with whether the factor increases or reduces likelihood that a particular route will be pursued by the POI; however, a particular weighting of factors is up to a designer of communication system 100. By way of another example, a determining of a more likely destination of the POI from among multiple possible destinations, and correspondingly a more likely geographical route of the POI from among multiple possible routes, may include consideration a weight assigned to various collected social media content. For example, a weight may be assigned to various collected social media content based on a level of relatedness of the social media content to the POI. For example, a closer blood relation may be assigned a higher weight than a more distant relation, a fellow gang member may be assigned a higher, or lower, weight than a blood relation, a person more recently in contact with the POI (for example, detected via Facebook postings) may be assigned a higher weight than a person less recently in contact with the POI, a person present at a given incident along with the POI (for example, detected via Facebook postings, tweets, or based on facial recognition analysis of the situational data sourced by data capture devices 121-128) may be assigned a higher weight than a person not present at the given incident, and so on. Again, a weight to be assigned to each such factor in determining a most likely geographical route, and an algorithm used to factor in multiple such factors and weights, is up to a designer of communication system 100 as many such algorithms are possible.

Based on the predicted one or more of the destination of the POI and the route of the POI, social media information processing system 102 may control (314) one or more of data capture devices 121-128. For example, social media information processing system 102 may instruct a data capture device 121-128 to adjust its orientation, such as up or down and/or left or right, and a corresponding field of view (FOV) so that the FOV includes the predicted destination or a portion of the predicted route. Further, based on the predicted destination and/or route of the POI, social media information processing system 102 may determine (316) an interception point for the POI, that is, a geographical area at which public safety personnel may intercept the POI. That is, based on the current route of the POI and the times at which the POI is detected at various locations in geographical area/scene 120, social media information processing system 102 may calculate an expected time of arrival of the POI at various places in geographical area/scene 120 and correspondingly a time and place of interception may be determined. Further, based on the predicted destination and/or route of the POI, social media information processing system 102 may determine (318) a geofence or adjust a geofence if one already has been determined, for example, with respect to an occurrence of an incident, such that the geofence will encompass the predicted destination and/or route of the POI. Logic flow 300 the ends (322).

Further, in another embodiment of the present invention, based on the predicted destination and/or route of the POI, social media information processing system 102 also may generate (320) a follow-up action, such as dispatching one or more public safety officers, such as law enforcement officers, to the predicted destination and/or the intercept point of the POI. For example, social media information processing system 102 may convey an instruction to the public safety personnel that are located in, or headed to, the geofence to apprehend the POI at the predicted destination and/or the intercept point. Logic flow 300 the ends (322).

Thus, communication system 100 provides an informational tool for law enforcement agencies to track a POI and to predict an intercept point or a destination where the POI may be found, based on situational data and social media content. Further, communication system 100 utilizes this information to generate further actions, such as dispatching public safety officer 150 located in geographical area 120 or public safety officer 154 headed toward geographical area 120 to the predicted intercept point or destination.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A social media information processing system comprising:
   a network interface configured to receive personal information and social media content associated with the a person of interest (POI) from network elements external to the social media information processing system;
   a processor; and
   an at least one memory device that is configured to store a set of instructions that, when executed by the processor, cause the processor to perform the following functions:
      identify the POI;
      determining locations of the POI;
      tracking the POI based on the determined locations of the POI;
      assemble a collection of personal information and social media content associated with the POI;
      predict a destination of the POI based on the collection of personal information and social media content and the direction of movement and relatives and associates of the POI and the relatives and associates corresponding locations or addresses; and
      determine an intercept point for the POI based on the predicted.

2. The social media information processing system of claim 1, wherein the at least one memory device further is configured to store a set of instructions that, when executed by the processor, cause the processor to predict one or more of a destination of the person of interest (POI) and a movement of the POI by one or more of:
   selecting a more likely destination of the POI from among a plurality of possible destinations;
   selecting a more likely geographical route of the POI from among a plurality of possible geographical routes.

3. The social media information processing system of claim 1, wherein the at least one memory device further is configured to store a set of instructions that, when executed by the processor, cause the processor to predict one or more of a destination of the person of interest (POI) and a movement of the POI by:
   determining one or more of a relative of the POI and an associate of the POI based on the collection of personal information and social media content; and
   predicting one or more of a destination of the POI and a movement of the POI based on the determination of one or more of a relative of the POI and an associate of the POI.

4. The social media information processing system of claim 1, wherein the at least one memory device further is configured to store a set of instructions that, when executed by the processor, cause the processor to predict one or more of a destination of the person of interest (POI) and a movement of the POI by:
   determining public transit information by reference to a mapping data database; and
   predicting one or more of a destination of the POI and a movement of the POI further based on the public transit information.

5. The social media information processing system of claim 1, wherein the social media content comprises situational data captured by one or more data capture devices across a geographical area.

6. The social media information processing system of claim 1, wherein the social media information processing system further comprises a mapping data database and wherein the at least one memory device further is configured to store a set of instructions that, when executed by the processor, cause the processor to predict one or more of a destination of the person of interest (POI) and a movement of the POI by reference to the mapping data database.

7. The social media information processing system of claim 1, wherein the at least one memory device further is configured to store a set of instructions that, when executed by the processor, cause the processor to assemble a collection of personal information and social media content associated with the person of interest by:
   collecting personal information and social media content that one or more of comprises or references a common personal information value.

8. The social media information processing system of claim 1, wherein the at least one memory device further is configured to store a set of instructions that, when executed by the processor, cause the processor to:
   control one or more data capture devices based on the predicted one or more of the destination of the person of interest (POI) and the movement of the POI.

9. The social media information processing system of claim 1, wherein the at least one memory device further is configured to store a set of instructions that, when executed by the processor, cause the processor to one or more of:
   determine a geofence based on the predicted one or more of a destination of the person of interest (POI) and a movement of the POI; and
   adjust a geofence based on the predicted one or more of a destination of the person of interest (POI) and a movement of the POI.

* * * * *